(12) United States Patent
Zhou

(10) Patent No.: US 12,375,825 B2
(45) Date of Patent: Jul. 29, 2025

(54) METHOD AND SYSTEM FOR GENERATING DVS FRAMES

(71) Applicant: Harman International Industries, Incorporated, Stamford, CT (US)

(72) Inventor: Rengao Zhou, Shanghai (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 126 days.

(21) Appl. No.: 18/546,080

(22) PCT Filed: Mar. 29, 2021

(86) PCT No.: PCT/CN2021/083544
§ 371 (c)(1),
(2) Date: Aug. 10, 2023

(87) PCT Pub. No.: WO2022/204865
PCT Pub. Date: Oct. 6, 2022

(65) Prior Publication Data
US 2024/0137663 A1 Apr. 25, 2024
US 2024/0236518 A9 Jul. 11, 2024

(51) Int. Cl.
*H04N 25/47* (2023.01)
*H04N 5/14* (2006.01)
(Continued)

(52) U.S. Cl.
CPC .......... *H04N 25/47* (2023.01); *H04N 5/2621* (2013.01); *H04N 5/265* (2013.01); *H04N 23/81* (2023.01); *H04N 5/144* (2013.01)

(58) Field of Classification Search
CPC ...... H04N 5/144; H04N 5/2621; H04N 23/81; H04N 25/265; H04N 25/47
See application file for complete search history.

(56) References Cited

U.S. PATENT DOCUMENTS 10,198,660 B2 2/2019 Ji et al.
2017/0213324 A1* 7/2017 Wang ................. G06T 5/50
(Continued)

FOREIGN PATENT DOCUMENTS

| CN | 107610069 A | 1/2018 |
|---|---|---|
| CN | 110971792 A | 4/2020 |
| WO | 2020195934 A1 | 10/2020 |

OTHER PUBLICATIONS

ISA National Intellectual Property Administration of the People's Republic of China, International Search Report Issued in Application No. PCT/CN2021/083544, Jan. 4, 2022, WIPO, 2 pages.
(Continued)

*Primary Examiner* — Lin Ye
*Assistant Examiner* — Chriss S Yoder, III
(74) *Attorney, Agent, or Firm* — McCoy Russell LLP

(57) ABSTRACT

A method and system for generating frames for a DVS is disclosed. The method comprises: receiving DVS pixels of an object from a DVS; initializing a timespan to a timespan value; generating a frame by integrating DVS pixels captured within a timespan; evaluating a moving speed of the object; combining a plurality of consecutive frames into one combined frame when the evaluated moving speed is lower than a first threshold value. The system comprises a DVS configured to capture DVS pixels of an object; and a processor configured to receive the DVS pixels from the DVS and performed the method.

12 Claims, 8 Drawing Sheets

(51) Int. Cl.
*H04N 5/262* (2006.01)
*H04N 5/265* (2006.01)
*H04N 23/81* (2023.01)

(56) References Cited

U.S. PATENT DOCUMENTS

2018/0098082 A1\* 4/2018 Burns ................. H04N 19/117
2021/0042938 A1 2/2021 Chen et al.

OTHER PUBLICATIONS

Saner, D. et al., "High-Speed Object Tracking Using an Asynchronous Temporal Contrast Sensor," Vision, Modeling, and Visualization, 2014, 8 pages.
Damien, J. et al., "Convolutional Neural Network for Detection and Classification with Event-based Data," Proceedings of the 14th International Joint Conference on Computer Vision, Imaging and Computer Graphics Theory and Applications—vol. 5 VISAPP: VISAPP, Feb. 25, 2019, Prague, Czech Republic, 9 pages.
European Patent Office, Extended European Search Report Issued in Application No. 21933551.0, Nov. 11, 2024, Germany, 7 pages.

\* cited by examiner

METHOD AND SYSTEM FOR GENERATING DVS FRAMES

CROSS-REFERENCE TO RELATED APPLICATIONS

The present application is a U.S. National Phase of International Application No. PCT/CN2021/083544, entitled "METHOD AND SYSTEM FOR GENERATING DVS FRAMES", and filed on Mar. 29, 2021. The entire contents of the above-listed application are hereby incorporated by reference for all purposes.

TECHNICAL FIELD

This disclosure relates in general to a method and a system for generating DVS frames.

BACKGROUND ART

There is a new cutting-edge sensor called DVS (Dynamic Vision Sensor). The DVS only captures light intensity changes and then creates asynchronous DVS pixels (pixel events). As compared to a conventional camera, the DVS has advantages of low-latency, no motion blur, high dynamic range and low power consumption.

Unlike the conventional camera which creates a complete image or frame comprising continuous pixels, a DVS only creates asynchronous DVS pixels which may be discrete and discontinuous in space and time, and thus it is needed to integrate DVS pixels (pixel events) captured by a DVS within a timespan to make an image or frame. Since the DVS only captures light intensity changes, it may not capture enough pixels for a satisfactory image or frame in a certain timespan when the scene being shot by the DVS is stable, such as when objects to be detected are substantially stationary or move slowly in the scene. On the other hand, the DVS may capture too many redundant DVS pixels in a certain timespan when the scene changes fast, such as when an object to be detected moves fast in the scene.

Thus, there is a need for a method or system that can obtain satisfactory images or frames for a DVS regardless of the moving speed of the object to be detected.

In addition, there may exist a circumstance in which a portion of the scene may change quickly while another portion of the scene may changes slowly, such as when some objects to be detected may move fast in the scene while some other objects to be detected may move slowly or may be even stationary in the scene. Under this circumstance, the DVS may have captured too much redundant DVS pixels from the objects that move fast, but have not capture enough DVS pixels from the objects that move slowly or are stationary. Thus, there may be some difficulties in obtaining a satisfactory image or frame for both fast objects and slow objects.

Thus, there is a need for a method or system that can obtain satisfactory DVS images or frames for all objects to be detected when the objects in the scene have different moving speeds.

SUMMARY OF THE INVENTION

According to one of aspects of the disclosure, a method for generating frames for a DVS is provided, the method comprises: receiving DVS pixels of an object from a DVS; initializing a timespan to a timespan value; generating a frame by integrating DVS pixels captured within a timespan; evaluating a moving speed of the object; combining a plurality of consecutive frames into one combined frame when the evaluated moving speed is lower than a first threshold value.

According to one of aspects of the disclosure, a system for generating DVS frames is provided, the system comprises: a DVS configured to capture DVS pixels of an object; a processor configured to receive the DVS pixels from the DVS and perform the above mentioned method.

According to one of aspects of the disclosure, a computer readable storage medium storing a computer program is provided, the computer program can be executed by a processor to perform the above mentioned method.

Others systems, method, features and advantages of the disclosure will be, or will become, apparent to one with skill in the art upon examination of the following figures and detailed description. It is intended that all such additional systems, methods, features and advantages be included within this description, be within the scope of the disclosure, and be protected by the following claims.

BRIEF DESCRIPTION OF THE DRAWINGS

The disclosure can be better understood with reference to the flowing drawings and description. The components in the drawings are not necessarily to scale, emphasis instead being placed upon illustrating the principles of the disclosure. Moreover, in the figures, like reference numerals designate corresponding parts throughout the different views.

FIGS. 2A-2B, 3A-3B are images or frames showing a person detection in a scenario of drinking water, wherein FIGS. 2A-2B show images or frames when the person 200 is raising a cup to drink water while FIGS. 3A-3B show images or frames when the person 200 has finished drinking water and is putting the cup down onto a table;

BRIEF DESCRIPTION OF THE PREFERRED EMBODIMENTS

Figure 1A:
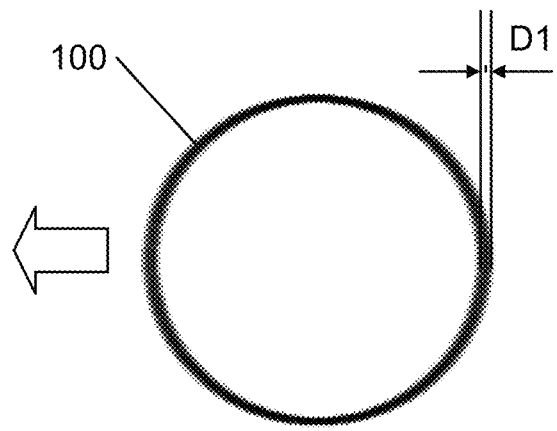
FIGS. 1A-1C show schematic views of images or frames of an object having different moving speeds, wherein the object 100 in FIG. 1A moves at a moderate speed in a direction shown in an arrow, the object 100 in FIG. 1B moves very fast in a direction shown in an arrow while the object 100 in FIG. 1C moves very slowly or is substantially stationary.

Hereinafter, the preferred embodiments of the present disclosure will be described in more detail with reference to the accompanying drawings.

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various elements, components, steps or calculations, these elements, components, steps or calculations should not be limited by these terms, rather these terms are only used to distinguish one element, component, step or calculation from another. For example, a first component could be termed a second component, similarly a first calculation could be termed a second calculation; similarly a first step could be termed a second step; all without departing from the scope of this disclosure.

As used herein, the terms "DVS pixel", "pixel event", "event" may be used interchangeable, and refer to a light intensity change captured by a DVS. A DVS pixel or pixel event or event may be represented by a pixel or event data, which normally takes a form of [x, y, t, p], in which x and y stand for the x coordinates and y coordinates, t stands for the time stamp of this event, and p stands for the polarity meaning whether the light intensity change is becoming brighter or darker. The terms "image" or "frame" of a DVS, or "DVS frame" refer to an image or frame into which all the pixels taken by a DVS within a timespan are integrated. The term "combined frame" refers to a frame generated by combing several consecutive DVS frames.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The DVS only captures intensity changes of light and then creates asynchronous DVS pixels (pixel events). In order to generate an image or frame for viewing or further processing, such as an objection recognition or movement detection, it is needed to integrate DVS pixels (pixel events) captured by a DVS within a timespan into one image or frame.

Since the DVS only captures intensity changes of light, the number of DVS pixels captured by the DVS within a timespan may be dependent upon a changing speed of the scene, such as a moving speed of an object to be recognized or detected in the scene. For example, if an object to be recognized or detected in the scene is substantially stationary or moves very slowly, the DVS may only capture very few DVS pixels (pixel events) of the object within a certain timespan, which may be insufficient for generating a satisfactory image or frame. On the other hand, if an object to be recognized or detected moves fast in the scene, the DVS may capture too many redundant pixels in the moving path of the object in a timespan, and thus generate a blurred image or frame.

Figure 1B:
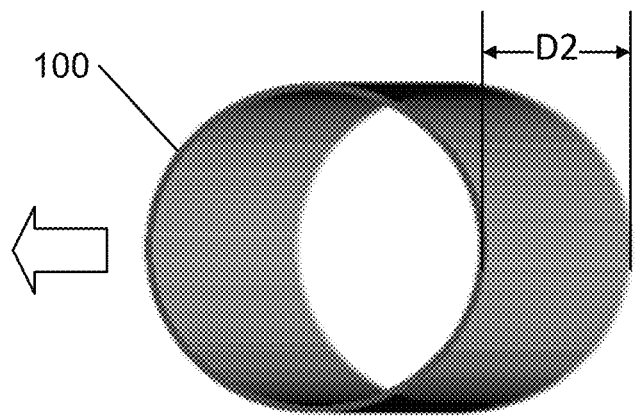
Figure 1C:
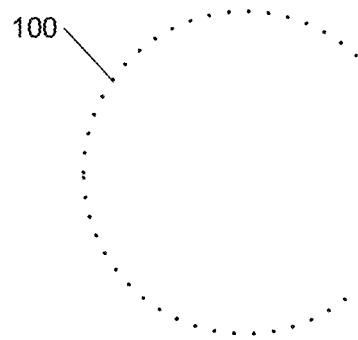

FIGS. 1A-1C show schematic views of images or frames of an object 100 having different moving speeds, wherein the object 100 in FIG. 1A moves at a moderate speed in a direction shown in an arrow, the object 100 in FIG. 1B moves very fast in a direction shown in an arrow while the object 100 in FIG. 1C moves very slowly or is substantially stationary. In FIG. 1A, the object 100 moves in a moderate speed and thus there are sufficient events of light intensity change in a timespan due to the movement of the object 100, and therefore the DVS can capture sufficient DVS pixels of the object 100 in a timespan. Meanwhile, the object 100 only travels a small distance D1 during the timespan and thus the image or frame generated by integrating all DVS pixels in the timespan is substantially clear and can clearly show the shape of the object (a circle).

In FIG. 1B, the object 100 moves fast, and travels a relative large distance of D2 in a timespan. Since the object 100 travels a relative large distance in a time span, the DVS may capture many redundant pixels in the moving path of the object in the timespan, and thus the image or frame generated by integrating all the DVS pixels in the timespan may be blurred and does not clearly show the shape of the object 100, which is undesirable or unsatisfactory.

In FIG. 1C, the object 100 moves slowly or is substantially stationary. Due to the slow movement of the object 100, there aren't many events of light intensity change of the object 100 in a timespan. Therefore, the DVS does not capture sufficient DVS pixels of the object 100 in a timespan, and thus in the image or frame generated by integrating all DVS pixels in the timespan, there aren't sufficient DVS pixels to clearly show the shape of the object (a circle), shown in a dotted circle in FIG. 1C.

Therefore, according to FIGS. 1A-1C, in order to obtain a satisfactory image or frame, the timespan used to integrate DVS pixels needs to match the moving speed of the object.

Figure 2A:
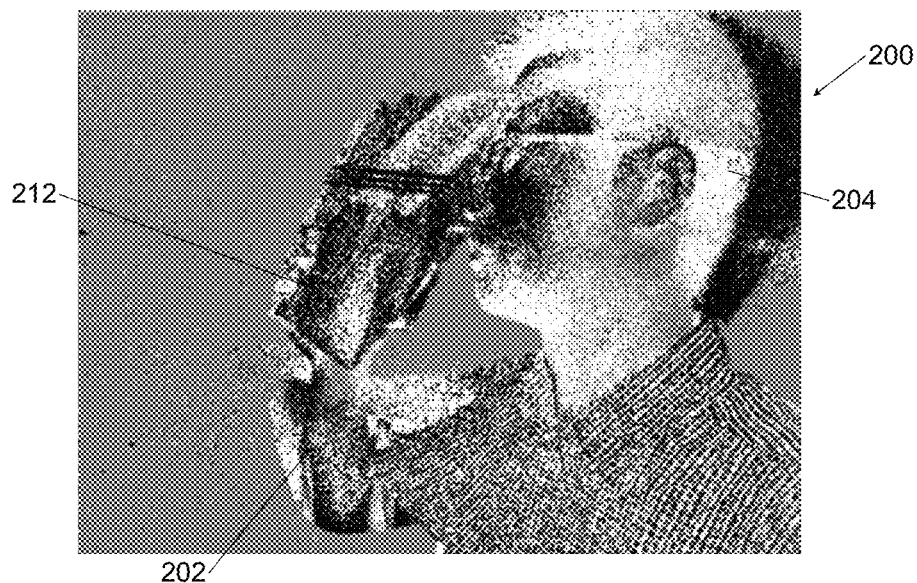
Figure 2B:
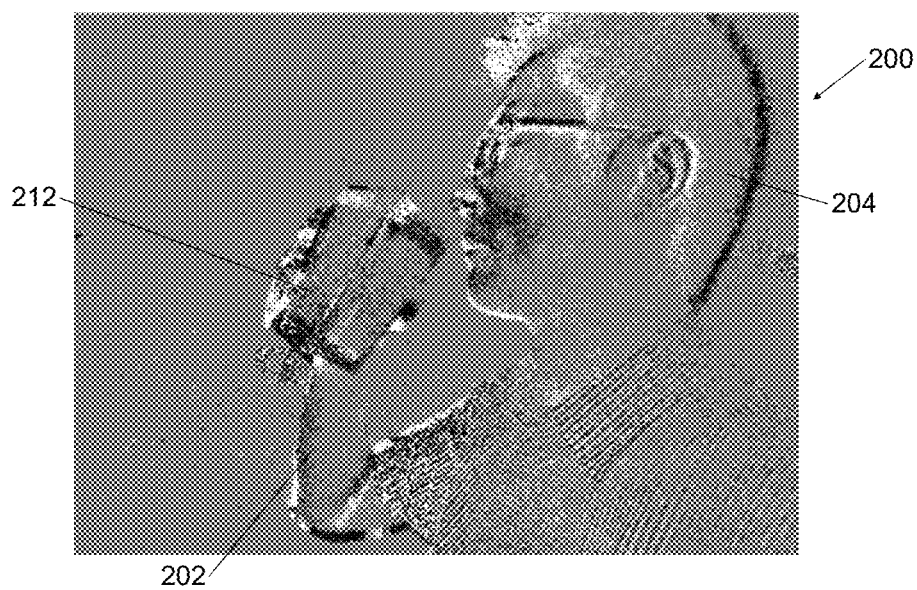
Figure 3A:
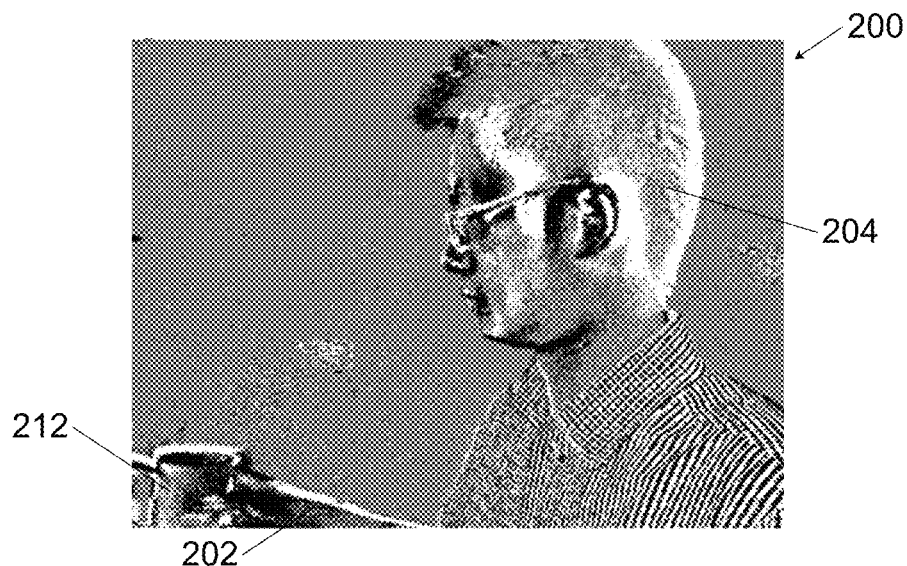
Figure 3B:
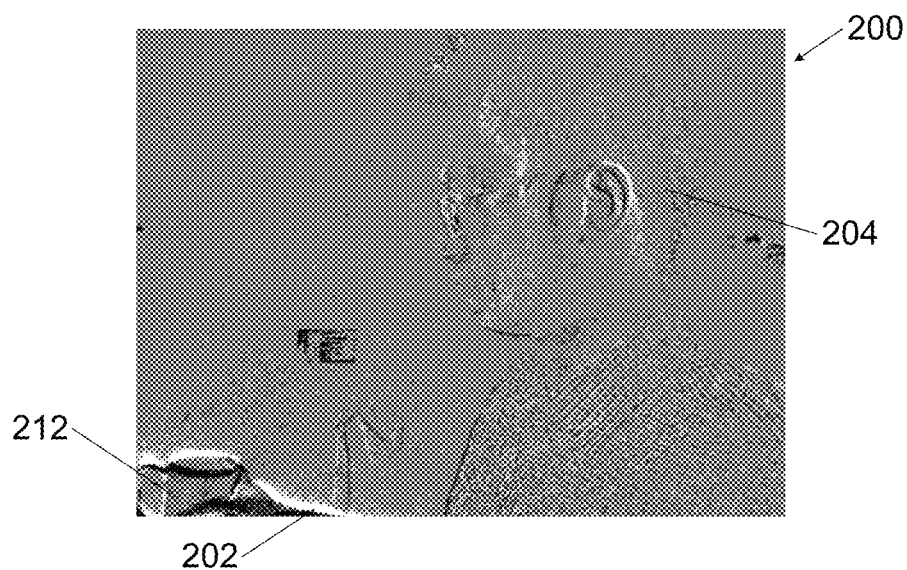

FIGS. 2A-2B, 3A-3B are images or frames showing a person detection in a scenario of drinking water, wherein FIGS. 2A-2B show images or frames when the person 200 is raising a cup to drink water while FIGS. 3A-3B show images or frames when the person 200 has finished drinking water and is putting the cup down onto a table.

At the moment shown in FIGS. 2A-2B, i.e., when the person 200 is raising the cup 212 to drink water, the cup 212 and some portions of the person 200, such as an arm 202 and a head 204, move at a relatively fast speed. The image or frame shown in FIG. 2A is generated by integrating DVS pixels captured by a DVS in a first timespan while the image or frame shown in FIG. 2B is generated by integrating DVS pixels captured by a DVS in a second timespan, wherein the first timespan is longer than the second timespan. Since the cup 212, the head 204 and the arm 202 move relatively fast and the first timespan is relatively long, the cup 212, the head 204 and the arm 202 travel a relative large distance in the first timespan. Thus, the DVS may capture many redundant pixels in the moving paths of the cup 212, the head 204 and the arm 202 in the first timespan, and thus the image or frame generated by integrating DVS pixels in the first timespan may be blurred, which is undesirable or unsatisfactory. In addition, among the cup 212, the head 204 and the arm 202, the cup 212 may move the fastest, and thus in FIG. 2A, the cup is the most blurred and the least recognizable. As a comparison, a second timespan that is smaller than the first timespan is used to integrate DVS pixels into the image or frame of FIG. 2B. As shown in FIG. 2B, the cup 212, the head 204 and the arm 202 are much less blurred and more recognizable than those shown in FIG. 2A. Therefore, for the moment shown in FIGS. 2A-2B, i.e., when the person 200 is raising the cup 212 to drink water, a relatively small timespan is more appropriate due to the relatively fast moving speed of the cup 212, the head 204 and the arm 202, and the image or frame generated by using the relative small second timespan may be much more recognizable and satisfactory.

At the moment shown in FIGS. 3A-3B, i.e., when the person 200 has finished drinking water and is putting the cup down onto a table, the cup 212 and the person 200, such as his arm 202 and his head 204, move at a relatively slow speed. The image or frame shown in FIG. 3A is generated by using a same timespan as the first timespan of FIG. 2A, and the image or frame shown in FIG. 3B is generated by using a same timespan as the second timespan of FIG. 2B. Although the cup 212 and the person 200, such as his arm 202 and his head 204, move at a relatively slow speed, there are still sufficient events of light intensity change due to the relatively large first timespan. Meanwhile, the cup 212 and the person 200 only travel a small distance during the first timespan due to their relatively slow speed and thus the image or frame generated by integrating all DVS pixels in the first timespan can clearly show the shape of the cup 212 and the person 200. As a comparison, there aren't many events of light intensity change due to the relatively slow moving speed and the relatively small second timespan. Thus, in FIG. 3B, there aren't sufficient DVS pixels to clearly show the shape of the cup 122 and the person 200, which is undesirable or unsatisfactory.

Therefore, according to FIGS. 2A-2B, 3A-3B, in order to obtain a satisfactory frames throughout the whole drinking process, a relatively large timespan may be used when the cup and the person move at a relative slow speed while a relatively small timespan may be used when the cup and the person move at a relative fast speed.

The inventor of the present disclosure has found that although in human's eyes, the pixels seems to be continuous for stable objects in consecutive DVS frames with small timespans, such as those shown in FIG. 3B, the pixels are actually discontinuous. By analyzing pixels of stable or slow objects in consecutive DVS frames with small timespans, it has been found that, among consecutive DVS frames, if one of the consecutive frames has a DVS pixel at one specific coordinate position, there is only a very tiny possibility of having another DVS pixel at the same coordinate position in its neighboring frame or frames. That is, the DVS pixels in consecutive DVS frames are normally at different coordinate positions. Although two or more consecutive DVS frames may look very similar, each of the consecutive DVS frames mainly contains DVS pixels at different coordinate positions. Thus, it is possible to combine together consecutive DVS frames with insufficient information or DVS pixels so that the DVS pixels contained in consecutive DVS frames can be complementary to one another to provide a combined frame with sufficient information or DVS pixels.

Figure 4:
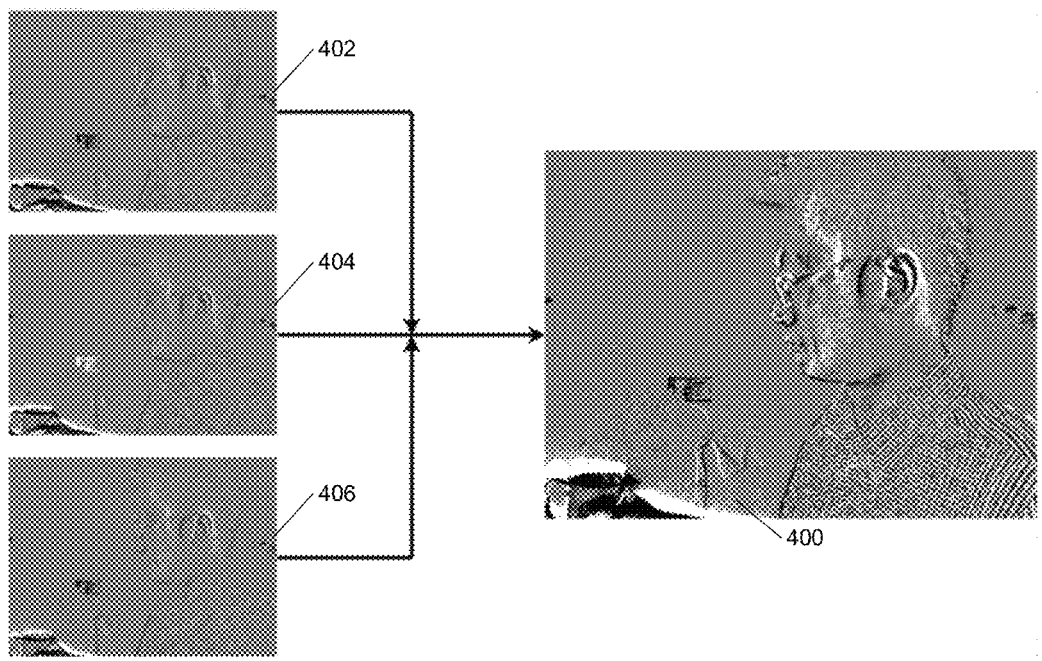
FIG. 4 shows an example of combining consecutive DVS frames into one combined frame.

FIG. 4 shows an example of combining consecutive DVS frames into one combined frame. Frames 402, 404, 406 shown in FIG. 4 are consecutive DVS frames, each of which is similar to the frame shown in FIG. 3B. The inventor of the present disclosure has found that although frames 402, 404, 406 look very similar to one another, when one of the consecutive frames 402, 404, 406 has a DVS pixel at one specific coordinate position, there is only a very tiny possibility of having another DVS pixel at the same coordinate position in the other two of frames 402, 404, 406. That is, although frames 402, 404, 406 look similar to one another, the coordinate positions of the DVS pixels in one of frames 402, 404, 406 may be substantially or nearly completely different from those in the other two of frames 402, 404, 406, which may be unexpected and counter-intuitive. Thus, when frames 402, 404, 406 are combined into one combined frame 400, the DVS pixels in each of frames 402, 404, 406 can be complementary to one another, resulting a satisfactory combined frame with sufficient information or DVS pixels.

The disclosure provides for a method and a system for generating frames for a DVS. The method of the present disclosure comprises: receiving DVS pixels of an object from a DVS; initializing a timespan to a small timespan value; generating a frame by integrating the DVS pixels captured within a timespan; evaluating a moving speed of the object; combining a plurality of consecutive frames into one combined frame when the evaluated moving speed is lower than a first threshold value. Since the timespan is set to be a small value, the object will travel a small distance and therefore, there won't be many redundant pixels of the moving object that may blur the frame even when the object moves at a relatively fast speed. On the other hand, in the method of the present disclosure, a plurality of consecutive frames are combined into one frame when a moving speed of the object is low. By combing a plurality of consecutive frames into one combined frame, there will be sufficient DVS pixels in the combined frame to clearly show the shape of the object even when the object move very slowly or even is substantially stationary.

Figure 5:
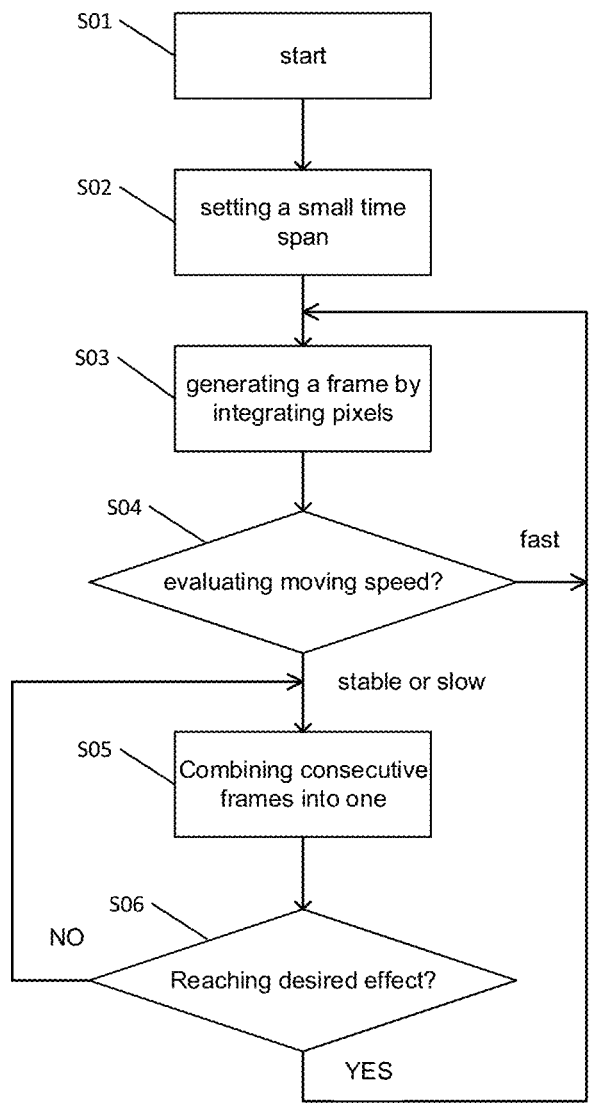
FIG. 5 shows a flowchart of a method according to some embodiments of the present disclosure.

FIG. 5 shows a flowchart of a method according to some embodiments of the present disclosure. The process starts at S01 and then goes to S02. At S02, a relatively small timespan is set. The relatively small timespan is set for the purpose of avoiding a blurred frame due to redundant DVS pixels even when the moving speed of the object is relatively large. Then the process goes to S03, at which a frame is generated by integrating DVS pixels captured by a DVS within a timespan. Then the process goes to S04, at which the moving speed of the object is evaluated. If the evaluated moving speed of the object is fast enough, then the process goes back to S03, where a next frame is generated by integrating DVS pixels captured by a DVS within a next timespan. If the evaluated moving speed is not fast enough, then the process goes to S05, at which a plurality of consecutive frames may be combined into one combined frame. Then the process goes to S06, at which an evaluation is performed regarding whether or not the combined frame has reached a desired effect. If the combined frame has not reach a desired effect (No), then the process goes back to S05, at which more consecutive frames are combined into the combined frame. If the combined frame has already reached a desired effect (Yes), then the process goes back to S03, at which a next frame is generated by integrating DVS pixels captured by a DVS within a next timespan.

The specific value of the small timespan set at S02 may be dependent upon the specific application scenario and may have any suitable value as long as the timespan is small enough to avoid a blurred frame due to redundant DVS pixels even when the moving speed of the object is relatively large in the scenario. In some embodiments of the present disclosure, the small timespan set at S02 may be 500 microseconds or less, 1 millisecond or less, 2 milliseconds or less, 3 milliseconds or less, 4 milliseconds or less.

The evaluation of the moving speed of the object at S04 may be performed in various ways. In some embodiments of the present disclosure, the moving speed of the object may be evaluated based on a number or density of DVS pixels in the frame generated at S03. If the number or density of DVS pixels in a portion of the frame or the whole frame exceeds a predefined value, then the moving speed of the object may be evaluated as fast. Otherwise, the moving speed of the object may be evaluated as stable or slow. In some other embodiments of the present disclosure, the moving speed of the object may be detected or evaluated by a suitable velocity sensor. In some other embodiments of the present disclosure, the evaluation or estimation of the moving speed of the object may be performed by using a deep learning algorithms or model. A deep learning algorithms or model is known in the art, and detailed description thereof is omitted.

According to some embodiments of the present disclosure, two, three, four or five consecutive frames may be combined into one combined frame at S05. However, the present disclosure is not limited thereto and the number of consecutive frames to be combined into one frame at S05 may be any suitable number. In some other embodiments, the number of the consecutive frames to be combined into one frame at S05 may be dependent upon the evaluation result from S04. For example, when the evaluated moving speed from S04 is very low, then a relatively large number of consecutive frames, e.g. four or five or more consecutive frames, may be combined into one frame at S05. Otherwise, a relatively small number of consecutive frames, e.g. two or three consecutive frames, may be combined into one frame at S05.

The evaluation regarding whether or not the combined frame has reached a desired effect at S06 may be performed in various ways. In some embodiments of the present disclosure, the evaluation may be performed based on a number or density of DVS pixels in the combined frame generated at S05. If the number or density of DVS pixels in a portion of the combined frame or the entire combined frame exceeds a predefined value, then it is determined that a desired effect has been reached. Otherwise, it is determined that a desired effect has not been reached. In some other embodiments, an area having high-density DVS pixels may be identified, and the evaluation may be performed based on a proportion of the high-density DVS pixel area in the frame. For example, in some embodiments, a frame may be divided into a plurality of areas, e.g., 100 areas, each area having DVS pixels more than a predefined number may be identified as a high-density DVS pixel area, and the evaluation may be performed based on the number of the high-density DVS pixel areas. For example, if the number of high-density DVS pixel areas in the combined frame exceeds a predefined number, then it is determined that a desired effect has been reached. Otherwise, it is determined that a desired effect has not been reached. In some other embodiments of the present disclosure, the evaluation regarding whether or not the combined frame has reached a desired effect may be performed by using a deep learning algorithms or model. The deep learning algorithms or model may be used to detect a desired object. If the detection is successful, that is, if the deep learning algorithms or model can recognize a desired object, then it is determined that a desired effect has been reached. Otherwise, it is determined that a desired effect has not been reached.

Figure 6:
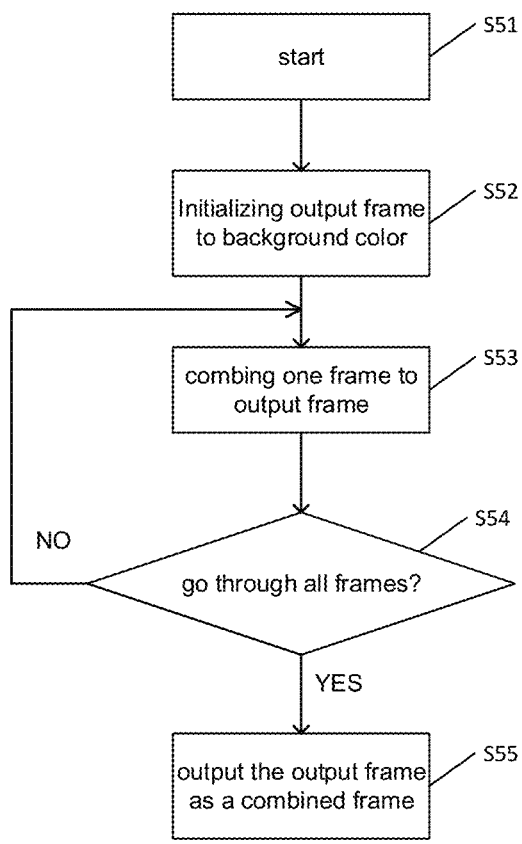
FIG. 6 shows an exemplary process of the step S05 of FIG. 5 according to some embodiments of the present disclosure.

FIG. 6 shows an exemplary process of the step S05 of FIG. 5 according to some embodiments of the present disclosure. The process starts at S51 and then goes to S52, at which an output frame is initialized by setting all pixels in the output frame to a background color (grey level). Then the process goes to S53, at which one of the plurality of consecutive frames is combined into the output frame. Then the process goes to S54, at which it is decided whether or not all of the plurality of consecutive frames have been combined into the output frame. If it is decided that all of the plurality of consecutive frames have been combined into the output frame, then the process goes to S55, at which the output frame is outputted as a combined frame. Otherwise, the process goes back to S53, at which a next one of the plurality of consecutive frames is combined into the output frame.

Although FIG. 6 shows an exemplary process of the step S05 of FIG. 5, the present disclosure is not limited thereto. For example, in some other embodiments, one of the plurality of consecutive frames may be set as an output frame and each of the other(s) of the plurality of consecutive frames may be combined into the output frame.

Figure 7:
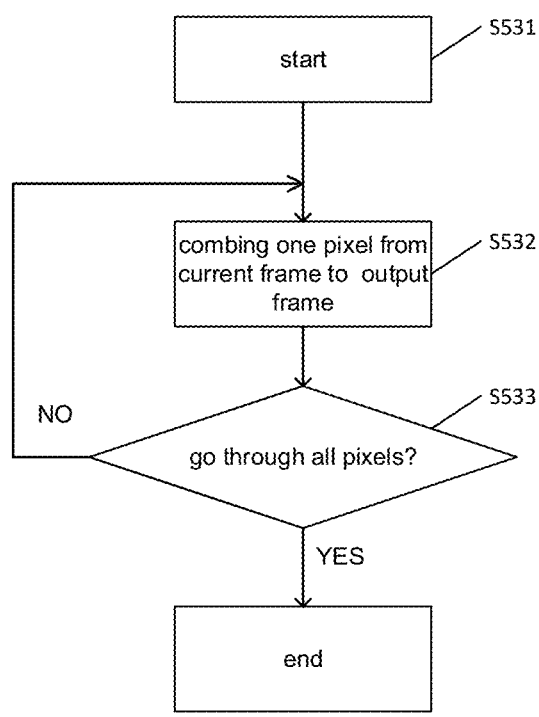
FIG. 7 shows an exemplary process of the step S53 of FIG. 6 according to some embodiments of the present disclosure.

FIG. 7 shows an exemplary process of the step S53 of FIG. 6 according to some embodiments of the present disclosure. The process starts at S531 and then goes to S532, at which one DVS pixel from the current frame is combined into the output frame. Then the process goes to S533, at which at which it is decided whether or not all of the DVS pixels in the current frame have been combined into the output frame. If it is decided that all of the DVS pixels in the current frame have been combined to the output frame, then the process goes to an end. Otherwise, the process goes back to S532, at which a next one of the DVS pixels in the current frame is combined into the output frame.

In the embodiments shown in FIG. 6, at S53, an entire frame of the plurality of consecutive frames is combined into the output frame. However, the present disclosure is not limited thereto. In some other embodiments, only a portion of the frame is combined into the combined frame. This is particularly beneficial and advantageous in a circumstance in which some objects to be detected may move fast while some other objects to be detected may move slowly or may be even stationary in the scene. Under this circumstance, the portion of the frame that contains the slow objects may be combined into the combined frame while the portion of the frame that contains the fast objects may not be combined into the combined frame. That is, for the portion of the frame that contains the slow object(s), more consecutive frames are combined into the combined frames while for the portion of the frame that contains the fast object(s), less consecutive frame(s) are combined into the combined frame. Thus, a satisfactory frame may be achieved for both fast objects and slow objects.

In some embodiments of the present disclosure, a DVS frame or a combined frame may be visualized as a greyscale, and each of the pixels in a DVS frame or a combined frame has multiple grey levels. Normally, each of the pixels of a greyscale may have 256 grey levels, i.e., from grey level 0 to grey level 255, wherein grey level 0 is white while grey level 255 is black and grey levels 1-254 are grey levels between white and black. However, the present disclosure is not limited thereto and the DVS frame or the combined frame of the present disclosure may be a greyscale having any suitable grey levels. In some embodiments of the present disclosure, the background color is an intermediate grey level between grey level 0 and grey level 255. In some embodiments of the present disclosure, the background color may be grey level 128. In some embodiments of the present disclosure, when pin [x, y, t, p] of a DVS pixel indicates that the light intensity is becoming darker, the grey level of the corresponding DVS pixel in the frame may be set to be grey level 255, and when p in [x, y, t, p] of a DVS pixel indicates that the light intensity is becoming brighter, the grey level of the corresponding DVS pixel in the frame may be set to be grey level 0. In such embodiments, any pixel in a DVS frame or a combined frame may be in one of three possible grey levels, i.e., grey level 0, grey level 128 and grey level 255. In some other embodiments of the present disclosure, the three possible grey levels may be grey levels other than grey level 0, grey level 128 and grey level 255, as long as the three possible grey levels are easily distinguishable from one another.

In some embodiments of the present disclosure, step S532 shown in FIG. 7 comprises copying the grey level of the current DVS pixel to a corresponding pixel in the output frame (combined frame), i.e., replacing the grey level of a pixel in the output frame (combined frame) with a grey level of a corresponding DVS pixel in the current frame. In such embodiments, the gray level of the DVS pixel in the combined frame is irrelevant to the sequential position of the source frame in the consecutive frames. In some other embodiments of the present disclosure, the grey level of the DVS pixel in the combined frame may be dependent upon the sequential position of the source frame in the consecutive DVS frames. The later the source frame is in the consecutive DVS frames, the farther the grey level of the result DVS pixel in the combined frame is from the background color (grey level). For example, when the consecutive DVS frames comprises three frames, i.e., frame 1, frame 2 and frame 3, then if the source DVS pixel is from the frame 3, the result DVS pixel will have a grey level that is farthest from the background color, and if the source DVS pixel is from the frame 1, the result DVS pixel will have a grey level that is nearest to the background color.

Figure 8:
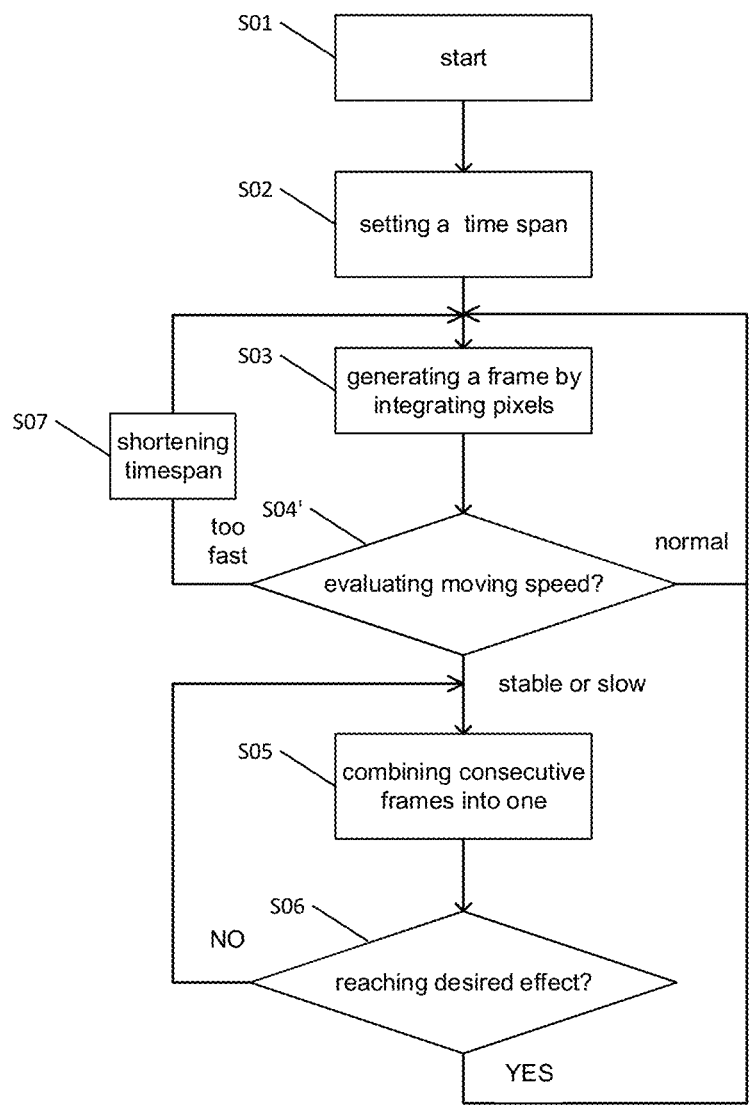
FIG. 8 shows a flowchart of a method according to some other embodiments of the present disclosure.

FIG. 8 shows a flowchart of a method according to some other embodiments of the present disclosure. The method shown in FIG. 8 is similar to that shown in FIG. 5, except steps S04' and S07. At S04', the moving speed of the object is evaluated. If the evaluated moving speed of the object is too fast, then the process to S07, at which the timespan is shortened, e.g., the timespan is set to be ½ of its current value. Then the process goes back to S03, at which a next frame is generated by integrating DVS pixels captured by a DVS within a shortened timespan or the current frame is regenerated by integrating DVS pixels captured by a DVS within a shortened timespan. If the evaluated moving speed is slow, then the process goes to S05, at which a plurality of consecutive frames may be combined into one combined frame. If the evaluated moving speed is a normal or moderate value, then the process goes back to S03, at which a next frame is generated by integrating DVS pixels captured by a DVS within a timespan. Other steps of the method shown FIG. 8 is similar to those shown in FIG. 5, and detailed description thereof is omitted.

According to some embodiments of the disclosure, the present disclosure can be implemented as follows.

Item 1: a method for generating frames for a DVS, comprising:
  receiving DVS pixels of an object from a DVS;
  initializing a timespan to a timespan value;
  generating a frame by integrating DVS pixels captured within a timespan;
  evaluating a moving speed of the object;
  combining a plurality of consecutive frames into one combined frame when the evaluated moving speed is lower than a first threshold value.

Item 2: the method for generating frames of Item 1, wherein combing a plurality of consecutive frames into one combined frame comprises combining each of the plurality of the consecutive frames into the combined frame one by one.

Item 3: the method for generating frames of any of Items 1-2, wherein combining a frame into one combined frame comprises combining each of the DVS pixels in the frame to the combined frame.

Item 4: the method for generating frames of any of Items 1-3, further comprising initializing each pixel in the combined frame to a background color.

Item 5: the method for generating frames of any of Items 1-4, wherein combining a DVS pixel into the combined frame comprises copying a grey level of the DVS pixel to a corresponding pixel in the combined frame.

Item 6: the method for generating frames of any of Items 1-5, wherein the moving speed is evaluated based on a number or density of DVS pixels in at least a portion of the frame.

Item 7: the method for generating frames of any of Items 1-6, wherein the moving speed is evaluated based on a proportion of a high-density DVS pixel area in the frame.

Item 8: the method for generating frames of any of Items 1-7, wherein combining a plurality of consecutive frames into one combined frame comprises combining consecutive frames into one combined frame until a number or density of pixels in at least a portion of the combined frame is no less than a threshold value.

Item 9: the method for generating frames of any of Items 1-8, further comprising resetting the timespan to a smaller timespan value when the evaluated moving speed is higher than a second threshold value, which is higher than the first threshold value.

Item 10: the method for generating frames of any of Items 1-9, wherein combing a plurality of consecutive frames into one frame comprises combing a portion of at least one frame of the plurality of consecutive frames into the combined frame.

Item 11: a system for generating DVS frames, comprising:
  a DVS configured to capture DVS pixels of an object;
  a processor configured to perform a method of any of Items 1-10.

Item 12: a computer readable medium storing a computer program that can be executed by a processor to perform a method of any of Items 1-10.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Systems and methods have been described in general terms as an aid to understanding details of the disclosure. In some instances, well-known structures, materials, and/or operations have not been specifically shown or described in detail to avoid obscuring aspects of the disclosure. In other instances, specific details have been given in order to provide a thorough understanding of the disclosure. One skilled in the relevant art will recognize that the disclosure may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the disclosure. Accordingly, the disclosure is not to be restricted except in light of the attached claims and their equivalents.

The invention claimed is:

1. A method for generating frames for a DVS, comprising:
receiving DVS pixels of an object from a DVS;
initializing a timespan to a timespan value;
generating a frame by integrating DVS pixels captured within a timespan;
evaluating a moving speed of the object;
combining a plurality of consecutive frames into one combined frame when the evaluated moving speed is lower than a first threshold value.

2. The method for generating frames of claim 1, wherein combining a plurality of consecutive frames into one combined frame comprises combining each of the plurality of the consecutive frames into the combined frame one by one.

3. The method for generating frames of claim 2, wherein combining a frame into one combined frame comprises combining each of the DVS pixels in the frame to the combined frame.

4. The method for generating frames of claim 3, further comprising initializing each pixel in the combined frame to a background color.

5. The method for generating frames of claim 4, wherein combining a DVS pixel into the combined frame comprises copying a grey level of the DVS pixel to a corresponding pixel in the combined frame.

6. The method for generating frames of claim 1, wherein the moving speed is evaluated based on a number or density of DVS pixels in at least a portion of the frame.

7. The method for generating frames of claim 1, wherein the moving speed is evaluated based on a proportion of a high-density DVS pixel area in the frame.

8. The method for generating frames of claim 1, wherein combining a plurality of consecutive frames into one combined frame comprises combining consecutive frames into one combined frame until a number or density of pixels in at least a portion of the combined frame is no less than a threshold value.

9. The method for generating frames of claim 1, further comprising resetting the timespan to a smaller timespan value when the evaluated moving speed is higher than a second threshold value, which is higher than the first threshold value.

10. The method for generating frames of claim 1, wherein combining a plurality of consecutive frames into one frame comprises
combining a portion of at least one frame of the plurality of consecutive frames into the combined frame.

11. A system for generating DVS frames, comprising:
a DVS configured to capture DVS pixels of an object;
a processor configured to perform a method of claim 1.

12. A computer readable storage medium storing a computer program that can be executed by a processor to perform a method of claim 1.

* * * * *